United States Patent [19]

Shibata

[11] Patent Number: 4,636,167
[45] Date of Patent: Jan. 13, 1987

[54] INJECTION MOULDING CLAMPING APPARATUS FOR AN INJECTION MOULDING MACHINE

[75] Inventor: Tōru Shibata, Fukushima, Japan

[73] Assignee: Tsuois Corporation, Fukushima, Japan

[21] Appl. No.: 785,163

[22] Filed: Oct. 7, 1985

[30] Foreign Application Priority Data

May 4, 1985 [JP] Japan .................................. 60-95822

[51] Int. Cl.$^4$ ........................ B29C 45/64; B29C 45/67
[52] U.S. Cl. ..................................... 425/589; 425/556;
425/594; 425/595; 425/450.1; 425/451.9;
425/DIG. 221
[58] Field of Search ............... 425/542, 556, 554, 589,
425/595, 594, 450.1, 451.9, DIG. 221

[56] References Cited

U.S. PATENT DOCUMENTS 4,571,169  2/1986  Shima et al. ....................... 425/589

Primary Examiner—Jay H. Woo
Assistant Examiner—Timothy W. Heitbrink
Attorney, Agent, or Firm—Frishauf, Holtz, Goodman & Woodward

[57] ABSTRACT

Injection pressure acting on a molten material inside a nozzle in an injection process also acts on a mould clamping piston disposed in an injection cylinder to face an injection piston. The injection pressure acting on the mould clamping piston is transmitted to an auxiliary platen mounted at the right ends of tie bars, thus producing tensile force in the tie bars. Because of the tensile force, a movable platen mounted at the left ends of the tie bars is pulled toward a stationary platen, which in turn presses a movable mould against a stationary mould. Consequently, clamping force proportional to the injection pressure acts on the moulds, thus firmly clamping the moulds.

10 Claims, 7 Drawing Figures

INJECTION MOULDING CLAMPING APPARATUS FOR AN INJECTION MOULDING MACHINE

BACKGROUND OF THE INVENTION

1. Field of the Invention

This invention relates to an injection moulding method for a material, such as metal, ceramics or plastic, and a mould clamping apparatus for an injection moulding machine.

2. Description of the Prior Art

It is known that an injection moulding machine generally comprises an injection apparatus for melting a material supplied thereto and then injecting the molten material into the cavity of moulds and a mould clamping apparatus for applying predetermined clamping force to the moulds. The molten material is injected into the cavity by moving an injection piston. In an actual injection moulding process, as high quality of a moulding article is demanded, it is also demanded to increase the necessary injection pressure per unit projection area of the moulding article and the mould clamping force for clamping the moulds against the injection pressure (to be specific, against the pressure of the molten material in the cavity that is proportional to the injection pressure). The injection pressure is normally set at $500 \sim 5000$ Kg/cm$^2$. But, the pressure of the molten material in the cavity is reduced to $30 \sim 70\%$ due to the viscosity of the molten material and the resistance in the liquid passage behind a nozzle and thus becomes $250 \sim 2000$ Kg/cm$^2$. Large injection pressure is pre-set for a molten material with a high viscosity, or a large liquid passage, which greatly reduces the pressure of the molten material. The mould clamping force should be at least $250 \sim 2000$ Kg/cm$^2$ per unit projection area of a moulding article. Therefore, even for a moulding article with 5 cm$^2$-projection area, the mould clamping force of about 10 tons may be required depending on a demanded quality or a material used.

According to a conventional injection moulding method, a movable platen is moved toward a stationary platen to press the movable mould against the stationary mould and thus close these moulds. Then, mould clamping force is applied to the moulds to prevent the moulds from being opened by the injection pressure of a molten material that is to be injected into the cavity. The injection piston is moved to inject the molten material into the cavity. The mould clamping force is released to separate the movable platen from the stationary platen, thereby opening the moulds. Then, the moulding article is ejected from the cavity. As explained above, the conventional injection moulding method involve a step of applying the mould clamping force to the moulds before injecting the molten material into the cavity.

There are three well-known types of mould clamping apparatuses for an injection moulding machine, namely, a straight hydraulic mould clamping apparatus, a toggle type mould clamping apparatus and a direct clamp type mould clamping apparatus.

In the straight hydraulic mould clamping apparatus, a movable platen is directly coupled to the distal end of the piston inside the hydraulic mould clamping cylinder, and pressurized oil is supplied to the hydraulic cylinder to produce the mould clamping force. To quickly open or close the moulds, a mould opening/closing cylinder with a small diameter is provided with a mould clamping hydraulic cylinder having a large diameter in such a manner that a mould opening/closing piston is moved inside this cylinder.

The mould clamping force generated in the straight hydraulic mould clamping apparatus is proportional to the cross-sectional area of the hydraulic cylinder, which normally should have a large diameter, thus enlarging the mould clamping apparatus.

In contrast, the toggle type mould clamping apparatus increases the mould clamping force acting on the piston, using a toggle mechanism. This system can easily provide large mould clamping force as compared with the diameter of the hydraulic cylinder. But, the provision of the toggle mechanism complicates the mould clamping apparatus and enlarges the apparatus.

In the direct clamp type mould clamping apparatus, a mould clamping cylinder is mounted in the stationary platen, to which pressurized oil is supplied to apply tensile force to tie bars. This tensile force directly pulls the tie bars, thus clamping the moulds. In other words, the direct clamp type mould clamping apparatus moves the piston in the hydraulic cylinder to close the moulds and applies a specific magnitude of mould clamping force to the moulds. And, the movable platen is clamped by a locking mechanism such as a half nut or a lock plate. Then, the pressurized oil is supplied to the mould clamping cylinder so as to pull the tie bars which serve as the mould clamping piston, thus further producing the mould clamping force. In this apparatus, the overall length of the mould clamping apparatus can be shortened, but it is difficult to attain large mould clamping force.

However, all of the three types of mould clamping apparatuses have the same basic structure wherein the pressurized oil is supplied to the hydraulic cylinder to move the piston, which pushes the movable platen coupled to the piston to produce the mould clamping force. In these types of apparatuses, after the mould clamping force is applied onto the moulds, a molten material is injected into the cavity. However, the mould clamping force generated in the conventional apparatuses is directly proportional to the cross-sectional area of the hydraulic cylinder, so that producing desired mould clamping force inevitably requires a hydraulic cylinder and a piston both with large cross-sectional area. Thus, it is difficult to make the mould clamping apparatus compact without complicating its structure. This drawback hinders the injection moulding machine from becoming compact.

As is clear from the above, the conventional mould clamping apparatus generally involves a hydraulic driving system which uses pressurized oil to move the piston. But, there is also another type of mould clamping apparatus using a motor-driven system in which a ball screw is formed in the periphery of the piston and the driving force of a servo motor is transmitted to the screw to move the piston. This mould clamping apparatus can quickly move the piston, thus shortening the time to open or close the moulds. But, in this system, attainment of desired mould clamping force necessitates the piston to have a larger diameter to increase the strength of the piston. What is more, to provide large mould clamping force, it is necessary to use a servo motor with large cross-sectional area. This makes it difficult to provide a smaller mould clamping apparatus and does not therefore contribute to making the injection moulding machine smaller.

SUMMARY OF THE INVENTION

It is a primary object of this invention to provide an injection moulding method, which can make a mould clamping apparatus smaller.

It is another object of this invention to provide an injection moulding method, which ensures desired mould clamping force.

According to a different point of view, it is a further object of this invention to provide a compact mould clamping apparatus for an injection moulding machine.

It is a still further object of this invention to provide a mould clamping apparatus for an injection moulding machine, which ensures desired mould clamping force.

To achieve these objects, the injection moulding method according to this invention utilizes the injection pressure acting on an injection piston for mould clamping force in an injection process. According to the mould clamping apparatus of this invention, a mould clamping means includes a converting means which converts the injection pressure acting on the injection piston into mould clamping force. According to this injection moulding method and mould clamping apparatus, the mould clamping force always acts on the moulds during the injection process, so that a mould clamping process is completely synchronized with the injection process. And, the mould clamping force is proportional to the injection pressure, so that the mould clamping force obtained can firmly clamp the moulds against the injection pressure. In addition, an injection cylinder can be used as a mould clamping cylinder, which ensures desired mould clamping force without increasing the diameters of the hydraulic cylinder and the injection piston. This simplifies the structure of the mould clamping apparatus and makes it smaller, thus contributing to making the injection moulding machine compact. Moreover, in a motor-driven type mould clamping apparatus, it is not necessary to use a large servo motor, thus making the mould clamping apparatus smaller.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
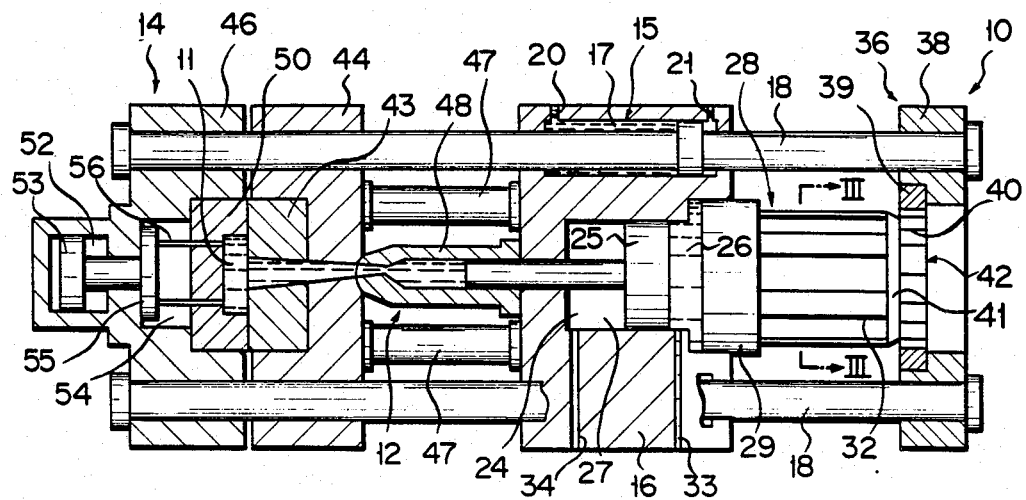
FIGS. 1 and 2 are schematic longitudinal sectional views showing a mould clamping apparatus for an injection moulding machine according to the first embodiment of this invention respectively at its mould closing position and mould opening position.
Figure 2:
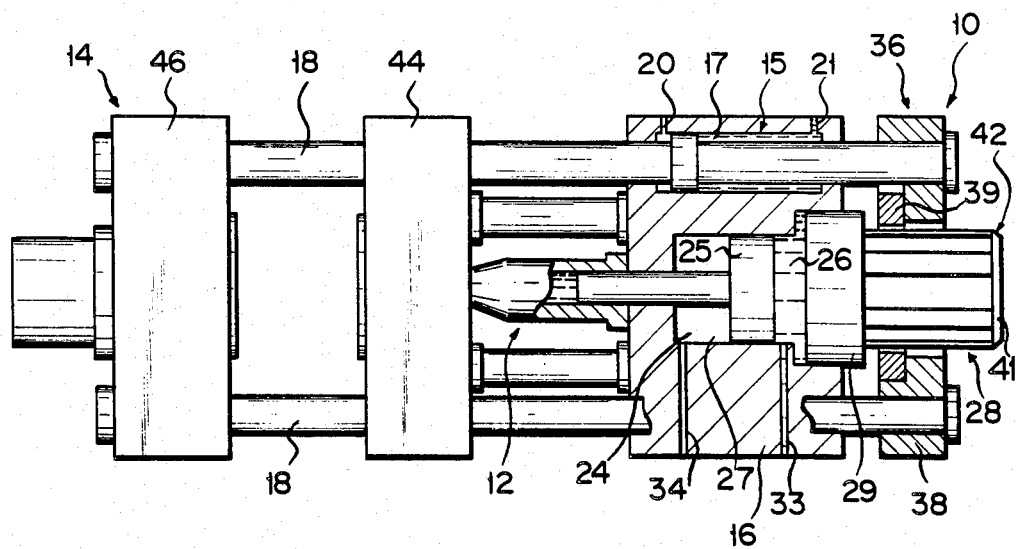

As illustrated in FIGS. 1 and 2, an injection moulding machine 10 comprises an injection apparatus 12, which melts a supplied material to be melted and injects it into a cavity 11 of moulds, and a mould clamping apparatus 14, which applies predetermined mould clamping force to the moulds. Because the injection apparatus 12 has a well-known structure, the structure of the mould clamping apparatus 14 will be mainly explained below.

The mould clamping apparatus 14 comprises a mould opening/closing means 15, which has four mould opening/closing cylinders 17 (only one is shown in the figures) formed at the respective corners of a housing 16. The mould clamping apparatus 14 is in its moulding closing position in FIG. 1 and in the mould opening position in FIG. 2. Needless to say, mould clamping and injection processes are carried out in the mould closing position. Four tie bars 18 extend, penetrating the housing 16, and each tie bar is integrally provided with a head which slides in the mould opening/closing cylinder 17. With this arrangement, when pressurized oil is supplied to the housing 16 through a passage 20 or 21, each tie bar 18 reciprocates and thus serves as a piston to execute the mould closing and opening.

Figure 3:
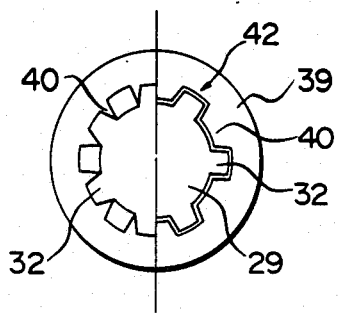
FIG. 3 is a transverse sectional view of the mould clamping apparatus of FIG. 1 taken along line III—III.

An injection cylinder 24 of the injection apparatus 12 is formed almost at the center of the housing 16, and an injection ram or piston 25 is reciprocatively disposed in the injection cylinder. The right portion 26 of the injection cylinder 24 has a larger diameter than the left portion 27 of the cylinder, and in this right portion is disposed a mould clamping piston 29 of a mould clamping means 28 so as to face the injection piston 25. The cross-sectional area of the right portion 26 of the injection cylinder 24 is determined in consideration of the magnitude of the mould clamping force with respect to the injection pressure. Normally, it is set to be twice or three times as large as the cross-sectional area of the injection piston 25. An outer spline 32 is formed at the periphery of the mould clamping piston 29 (see FIG. 3). Passages 33, 34, respectively communicating with the right portion 26 and left portion 27 of the injection cylinder 24, are formed in the housing 16.

The mould clamping means 28 has a converting means 36 which converts the injection pressure acting on the injection piston 25 into the mould clamping force and transmits it to the moulds. The converting means 36 synchronizes, as described later, the mould clamping process with the injection process, which provides the mould clamping force to firmly clamp the moulds against the injection pressure.

The converting means 36 comprises an auxiliary movable platen 38 mounted at the right end of each of the tie bars 18, and a hollow lock plate 39 is rotatably disposed in the auxiliary movable platen. An inner spline 40, which can be aligned with the outer spline 32 of the mould clamping piston 29, is formed at the inner periphery of the lock plate 39 (see FIG. 3). When the lock plate 39 is rotated by a driving unit (not shown) such as a motor to align the spline 32 with the spline 40 as shown in the right portion of FIG. 3, the mould clamping piston 29 is not hindered by the lock plate 39 and thus slides in the right direction without the auxiliary movable platen 38. But, when the splines 32, 40 do not align with each other as shown in the left portion of FIG. 3, the mould clamping piston 29 is locked by the lock plate 39, so that the piston become movable together with the auxiliary movable platen 38 in the right direction. These splines 32, 40 constitute a lock means 42 for the movable platen 46, which locks the movable platen when the molten material is injected into the cavity 11, and unlocks the movable platen when the moulds are opened. To be specific, the lock means 42 allows the auxiliary movable platen 38 to move together with the mould clamping piston 29 when the molten material is injected into the cavity, and prevents the auxiliary movable platen from moving together with the mould clamping piston when the moulds are opened.

To align the splines 32, 40, at least one of the lock plate 39 and mould clamping piston 29 should be rotatable. That is, the lock plate 39 is rotatably mounted to the auxiliary movable platen 38 relative to the mould clamping piston 29. The lock means 42 is not limited to the combination of the splines 32, 40, it may be obvious for a person skilled in the art to use other lock means.

An inclination 41 is formed at the distal end of the mould clamping piston 29 for smoothly rotating the lock plate 39 and returning the mould clamping piston 29 to its initial position. This inclination 41 may be formed at the left edge of the lock plate 39, instead of at the distal end of the mould clamping piston 29, or may be formed both at the distal end of the piston 29 and the left edge of the lock plate 39. Instead of the inclination 41, a biasing means such as a compression coil spring may be disposed to bias the mould clamping piston 29 to its initial position. The mould clamping piston 29 biasing to the initial position never interrupt the rotation of the lock plate 39.

As shown in FIG. 1, a stationary platen 44 to which a stationary mould 43 is attached is mounted to the tie bars 18 at the left side of the housing 16. The tie bars 18 extend through the stationary platen 44 in the left direction and a movable platen 46 is mounted at their left ends. Four support blocks 47 (only two are shown) are provided between the stationary platen 44 and the housing 16 so as to prevent a nozzle 48 from being damaged.

A movable mould 50 is attached at the front face or right face of the movable platen 46, and an ejector cylinder 52 is formed in the movable platen 46 to eject a moulding article from the cavity 11 after the injection moulding is completed. An ejector piston 53 is reciprocatively disposed in the ejector cylinder 52. A chamber 54 is formed in the movable platen 46 at the back of the movable mould 50, and in this chamber an ejector plate 55 coupled to the distal end of the ejector piston 53 is disposed. And, a plurality of ejector pins 56 extends from the ejector plate 55 to the back of the cavity 11. With this arrangement, when pressurized oil is supplied to the left portion of the ejector cylinder 52, the ejector piston 53 and ejector plate 55 are moved forward, i.e., in the right direction so that the ejector pins 56 abut on the moulding article, thus ejecting it from the cavity 11.

The operation of the injection moulding machine 10 having the aforementioned structure will now be explained. Suppose the mould clamping apparatus 14 is at the mould opening position as shown in FIG. 2. Then, when the pressurized oil is supplied to the left portion of the mould opening/closing cylinder 17 through the passage 20, the biasing force in the right direction acts on the individual head of the tie bars 18, each of which serves as the mould opening/closing piston, to move the tie bars in the right direction. Accordingly, the movable platen 46 mounted on the tie bars 18 moves toward the housing 16 so as to press the movable mould 50 against the stationary mould 43, thus closing the moulds (see FIG. 1). When the mould closing process is completed, the tie bars 18 are positioned at the right most position. The spline 40 of the lock plate 39 is set, before the mould opening process, to a position where it can be aligned with the spline 32 of the moulding clamping piston 29 (see the right portion of FIG. 3), and the mould clamping piston 29 is pre-positioned at the unlocking position. And, the auxiliary movable platen 38 mounted at the right ends of the tie bars 18 moves to the back of the mould clamping piston 29 with the movement of the tie bars, as shown in FIG. 1.

After the mould closing process is completed, the lock plate 39 is rotated so as not to align the spline 40 with the spline 32, thus locking the mould clamping piston 29. Locking the mould clamping piston 29 also locks the movable platen 46. Because the inclination 41 is formed at the distal end of the clamping piston 29, even if the distal end of the mould clamping piston 29 is located in the lock plate 39 when the lock plate is rotated, the mould clamping piston moves in the left direction so as not to interrupt the rotation of the lock plate. The pressurized oil is supplied to the right portion 26 of the injection cylinder 24 through the passage 33. The supply of the pressurized oil moves the injection piston 25 from its initial position to the left, i.e., the injection piston moves forward, thus injecting the molten material from the nozzle 48 into the cavity 11. When the injection piston 25 is moved forward, the same injection pressure applied onto the injection piston also acts on mould clamping piston 29 to push the mould clamping piston from the initial position to the right direction. At this time, the splines 32, 40 are not yet aligned, and the mould clamping piston 29 is at the locking position. Therefore, the mould clamping piston 29 abuts on the lock plate 39 behind the piston, which pushes the auxiliary movable platen 38 in the right direction. Because the auxiliary movable platen 38 is positioned at the right ends of the tie bars 18, it tends to move to the right together with the tie bars. But, the tie bars 18 have already moved to the right most position when the mould closing process is completed, there is not any space for the tie bars 18 to move in the right direction. As a result, the injection pressure that moves the auxiliary movable platen 38 to move in the right direction acts on the tie bars 18 as tensile force, so that the movable mould platen 46 mounted at the left ends of the tie bars is pulled rightward, thus further pressing the movable mould 50 against the stationary mould 43.

In other words, the injection pressure acting on the mould clamping piston 29 acts on the movable platen 46 via the auxiliary movable platen 38 and tie bars 18 as the mould clamping force. In the structure in which the injection cylinder 24 serves as the mould clamping cylinder and the injection pressure of the pressurized oil supplied to the injection cylinder is used as the mould clamping force, the mould clamping force proportional to the injection pressure is obtained, so that large mould clamping force can easily be realized. For example, desired mould clamping force can easily be obtained by properly setting the diameter of the mould clamping piston 29, i.e., the diameter of the head of the mould clamping piston, with respect to the diameter of the head of the injection piston 25. As compared with the conventional apparatuses which do not utilize the injection pressure as the mould clamping force, in this invention the injection cylinder can be used as the mould clamping cylinder, therefore, the mould clamping apparatus 14 or injection moulding machine 10 can be made compact.

After the cavity 11 is filled with a molten material, the moulds 43, 50 are cooled, thus completing the injection process. Then, the lock plate 39 is rotated to open the moulds in such a manner that the spline 40 is aligned with the spline 32 of the mould clamping piston 29. This unlocks the mould clamping piston 29. The pressurized oil is then supplied to the right portion of mould opening/closing cylinder 17 through the passage 21, which moves the tie bars 18 leftward as can be seen from FIG. 2. The movable platen 46 moves together with the tie bars 18 to the left direction, and the movable mould 50 is separated from the stationary mould 43, thus opening the moulds. Then, the pressurized oil is supplied to the left portion of ejector cylinder 52, which moves the ejector piston 53 together with the ejector plate 55 rightward. The moulding article is eventually ejected from the cavity 11 by the ejector pins 56.

Because the mould clamping piston 29 is at the unlocking position, when the tie bars 18 move leftward, the auxiliary movable platen 46 naturally moves leftward together with the tie bars without any interruption by the mould clamping piston. Further, after the injection process is completed, the injection piston 25 returns to the initial position by supplying the pressurized oil to the left portion 27 of the injection cylinder 24.

Figure 4:
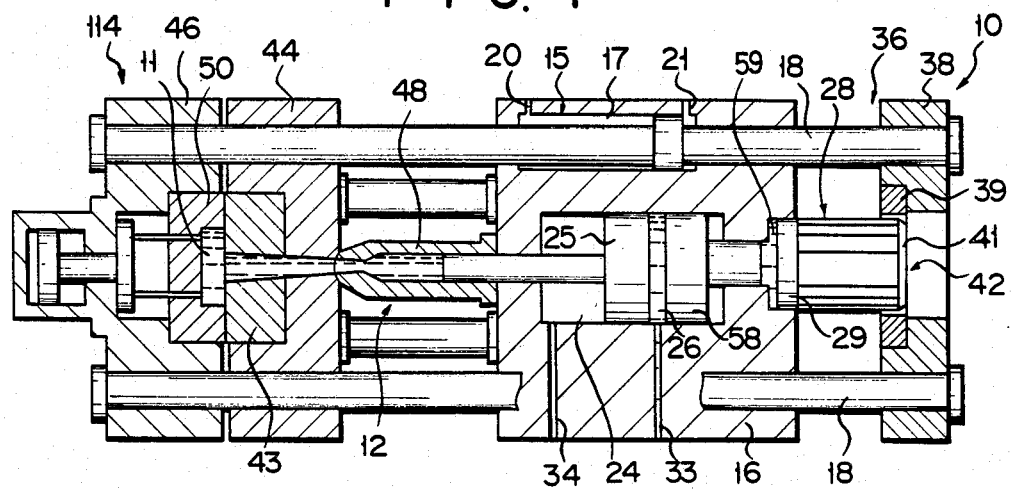
FIGS. 4 to 6 are schematic longitudinal sectional views respectively showing mould clamping apparatuses for an injection moulding machine according to the second to fourth embodiments at their mould closing position.

FIG. 4 illustrates a mould clamping apparatus 114 according to another embodiment of this invention. This embodiment has the same structure as the first embodiment except that a booster ram 58 is disposed between the mould clamping piston 29 and injection piston 25 in the second embodiment. The booster ram 58 slides in a chamber 60 filled with working medium such as working oil. This chamber 60 has a cross section, which increases the pressure acting on the booster ram 58 to two or three times and transmits it to the mould clamping piston 29. With the use of the booster mechanism, the diameter of the mould clamping piston 29 can be made smaller, which make the mould clamping apparatus compact. Needless to say, the booster ram may be used, if necessary, in other embodiments that will be explained later.

Figure 5:
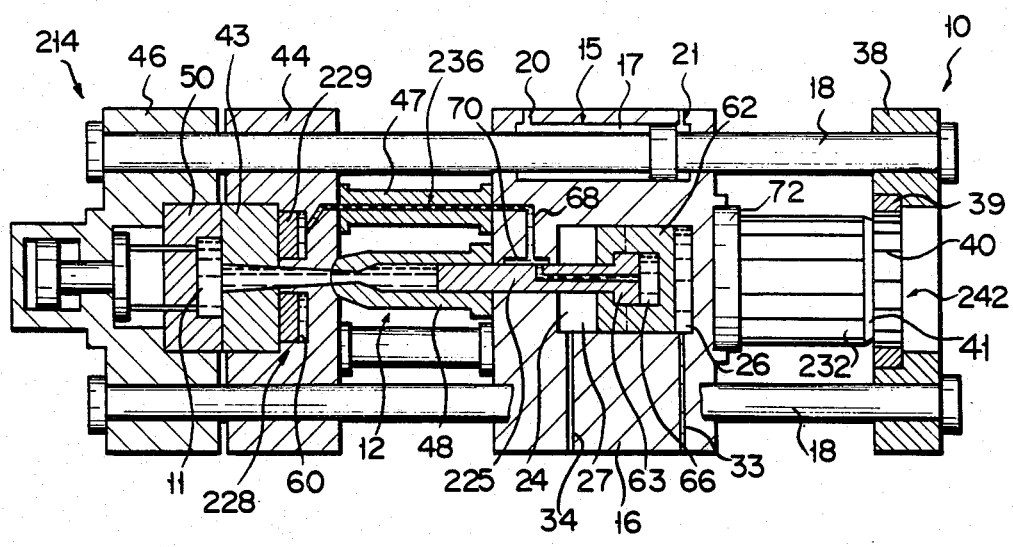

In the above embodiments, the mould clamping force is transmitted to the movable mould 50 via the movable platen 46 to clamp the moulds 43, 50. FIG. 5 shows a mould clamping apparatus 214 in which the mould clamping force acts on the stationary mould 43. In this mould clamping apparatus 214, a mould clamping means 228 comprises an annular mould clamping cylinder 60 formed in the stationary platen 44, a mould clamping piston 229, which presses the stationary mould 43 against the movable mould 50, and a converting means 236, which converts the reactive force from a molten material into the mould clamping force. Instead of the annular mould clamping cylinder 60, a plurality of small cylinders, for example, four small cylinders separated 90° from each other in the circumferential direction may be used.

An injection piston 225 of the injection apparatus 12 has a large-diameter head 62 and a small-diameter head 63. A chamber 66 is formed in the larger head 62 of the injection piston 225, and the smaller head 63 of the injection piston is slidably disposed in the chamber 66 with some space behind the smaller head. As indicated by the one-dot chain line, smaller head 63 of the injection piston 225 can be partially exposed within the injection cylinder 24. A connection passage 68 communicating the chamber 66 with the mould clamping cylinder 60 extends through the injection piston 225, housing 16 and support blocks 47. Reference numeral 70 denotes a notch which ensures communication between the chamber 66 and mould clamping cylinder 60 when the injection piston 225 moves. The notch 70 may clearly be formed in the peripheral surface of the injection piston 225. The chamber 66, mould clamping cylinder 60 and connection passage 68 are filled with working medium, e.g., working oil, so that the chamber and connection passage can serve as a converting means 236.

A lock bar 72 is attached to the back of the housing 16 and has an outer spline 232 on its peripheral surface. The spline 232 can be aligned with the inner spline 40 of the lock plate 39. The lock bar 72 extends to in front of the rotational lock plate 39, and is prevented by the lock plate 39 from moving rightward so as to be locked when the splines 40, 232 are not aligned. In this embodiment, the auxiliary movable platen 38 together with the lock bar 72 and lock plate 39 form a lock means 242 for the movable platen 46.

The other part of the mould clamping apparatus 214 has the same structure as the corresponding part of the first embodiment shown in FIGS. 1 and 2. This mould clamping apparatus 214 functions as follows.

When the pressurized oil is supplied to each mould opening/closing cylinder 17 via the passage 20, the movable platen 46 is moved rightward, thereby closing the moulds. Then, the lock plate 39 is rotated to a position where the spline 40 does not align with the spline 232, thus locking the lock bar 72 and movable platen 46.

When the pressurized oil is supplied to the right portion 26 of the injection cylinder 24 via the passage 33, the injection piston 225 moves forward to thereby inject the molten material from the nozzle 48 into the cavity 11. The forward movement of the injection piston 225 causes the reactive force of the molten material, namely, the injection pressure, to act on the injection piston 225. This compresses the working oil in the chamber 66. The pressure of the working oil in the chamber 66 is transmitted to the mould clamping cylinder 60 via the connection passage 68, and thus moves the mould clamping piston 229 forward to press the stationary mould 43 against the movable mould 50 for closing these moulds. When the stationary mould 43 is pressed against the movable mould 50, the movable platen 46 is pressed against the left ends of the tie bars, thus applying tensile force to the tie bars. The tensile force pulls the auxiliary movable platen 38 at the right ends of the tie bars 18 toward the left and moves the housing 16 leftward through the lock plate 39 and lock bar 232. As a result, the back up force of the mould clamping is applied to the stationary mould 43.

As clear from the above, in the mould clamping apparatus 214, the mould clamping piston 229 is arranged at the back of the stationary mould 43 in order to directly transmit the injection pressure to the mould clamping piston. This arrangement also ensures large mould clamping force proportional to the injection pressure without enlarging the mould clamping piston or the mould clamping cylinder. Therefore, the mould clamping apparatus can be made smaller than the conventional mould clamping apparatuses.

Figure 6:
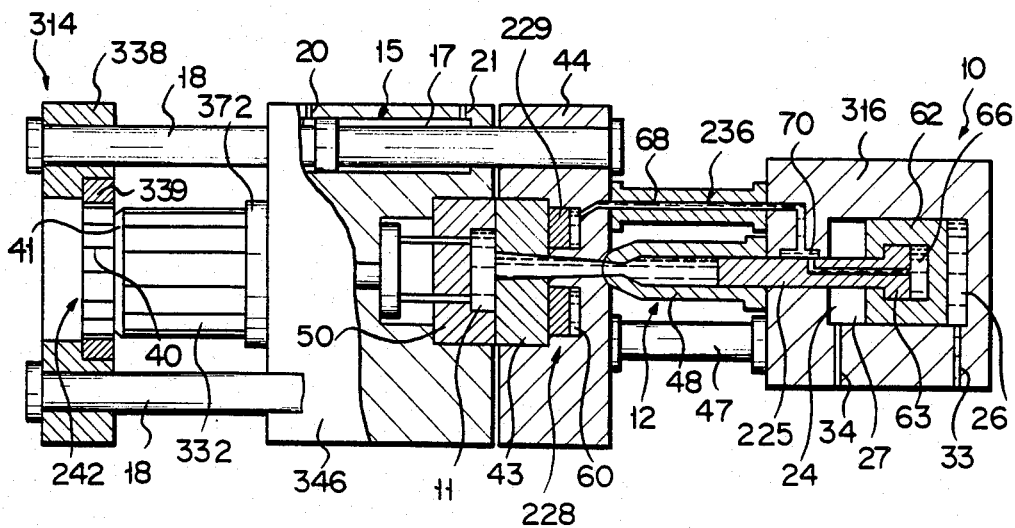

FIG. 6 shows the fourth embodiment of this invention. In this embodiment an auxiliary movable platen 338 of the mould clamping apparatus 314 is mounted at the left ends of the tie bars 18 and serves as an essential element of the lock means 242. A lock plate 339 having thereon the inner spline 40 is rotatably disposed in the auxiliary movable platen 338. A lock bar 372 having thereon an outer spline 332, which is alignable with the inner spline 40, is disposed at the back of a movable platen 346 so as to face the lock plate 339. The mould opening/closing cylinders 17 are provided in the movable platen 346, not in the housing 316. The structure of this mould clamping apparatus 314 is the same as the structure of the mould clamping apparatus 214 shown in FIG. 5.

With the above structure, when the pressurized oil is supplied to the right portion of each mould opening/closing cylinder 17 via the passage 21, the movable platen 346 slides rightward along the tie bars 18 so as to close the moulds. Then, the lock plate 339 is rotated so that the splines 40, 332 are unaligned, thereby locking the movable platen 346. Thereafter, when the pressurized oil is supplied to the right portion 26 of the injection cylinder 24, the injection piston 225 is moved forward, as has already been explained, so that the molten material in the nozzle 48 is injected into the cavity 11. The injection pressure acts on the injection piston 225 and at the same time is converted into the mould clamping force by the converting means 236. This mould clamping force acts on the mould clamping piston 229 for clamping the moulds. This embodiment also ensures large mould clamping force proportional to the injection pressure without enlarging the mould clamping piston or the mould clamping cylinder, which results in a smaller mould clamping apparatus.

Figure 7:
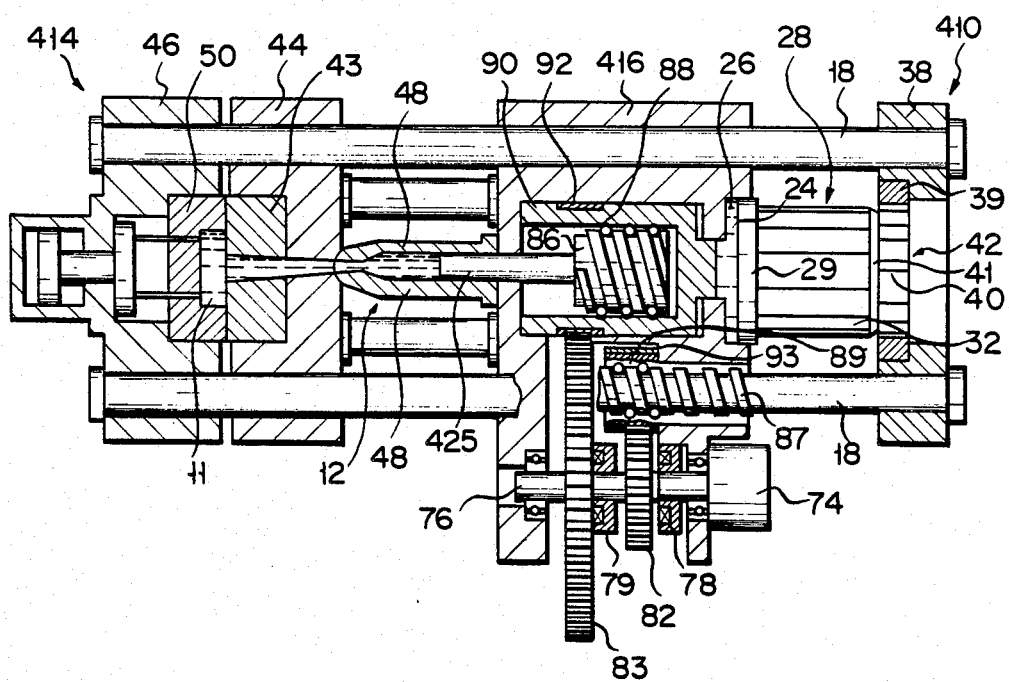
FIG. 7 is a schematic longitudinal sectional view showing a modification of the mould clamping apparatus of the first embodiment at its mould closing position.

In the above embodiments, the injection piston and movable platen are driven by the pressurized oil; however, they may be driven by using a servo motor. FIG. 7 illustrates a modification of the first embodiment shown in FIGS. 1 and 2. An injection moulding machine 410 shown in FIG. 7 is designed to transmit the driving force of a servo motor 74 to an injection piston 425 and the movable platen 46.

As shown in FIG. 7, the servo motor 74 is attached to the back of a housing 416. Electro-magnetic clutches 78, 79 are fixed to a motor shaft 76, and spur gears 82, 83 are slidably supported on the motor shaft so as to face the respective electro-magnetic clutches.

Ball screws 86, 87 are respectively formed on the head of an injection piston 425 and one of four tie bars 18. A slider 90 is disposed in the injection cylinder 24, and a nut 88 to be engaged with the ball screw 86 is formed in the inner surface of the slider. A spur gear 92 engaged with the spur gear 83 is provided on the outer periphery of the slider 90. A nut 89 to be engaged with the ball screw 87 is formed in the inner surface of a spur gear 93 engaged with the spur gear 82.

After the electro-magnetic clutch 78 is excited to be coupled to the gear 82, the servo motor 74 is started. The servo motor's driving force is transmitted to the gear 93 through the electro-magnetic clutch 78 and gear 82, thus rotating the gear 93. The rotation of gear 93 moves the tie bars 18 rightward by the guide of steel balls disposed in the nut 89 so as to close the moulds. Then, the clutch 78 is separated from the gear 82, so the clutch 79 is coupled to the gear 83 (see FIG. 7). When the clutch 79 and gear 83 are coupled, the driving force of the servo motor 74 is transmitted to the clutch 79 and gears 83, 92, so as to rotate the slider 90. Because the nut 88 is engaged with the ball screw 86, the rotation of the slider 90 moves an injection piston 425 forward to inject the molten material into the cavity 11 from the nozzle 48. When the molten material is injected into the cavity, the reacting force of the molten material acts on the injection piston 425 to move the slider 90 rightward. This compresses the working medium, e.g., working oil, filling the right portion 26 of the injection cylinder 24. The pressure of the working oil in turn acts on the mould clamping piston 29, so that the mould clamping process and the injection process are simultaneously carried out.

Of course, the moulds are opened by rotating the tie bars 18 in the direction opposite to the direction in which the tie bars are rotated in the mould closing process.

In this motor-driven type mould clamping apparatus, servo motor 74 merely drives the injection piston 425 and tie bars 18. This makes it possible to use a smaller servo motor as compared with the conventional apparatus in which the servo motor directly drives the mould clamping piston. Moreover, the mould clamping piston should not have a larger diameter. Therefore, the mould clamping apparatus can be made smaller.

As explained above, according to this invention, the injection pressure is used as the mould clamping force, so that the large mould clamping force proportional to the injection pressure can always be obtained without enlarging the mould clamping piston, mould clamping cylinder or servo motor and the injection moulding machine can naturally be made smaller.

What is claimed is:

1. A mould clamping apparatus for an injection moulding machine comprising:
   a plurality of tie bars having a peripheral surface
   a stationary platen mounted to the tie bars, said stationary platen having a back surface and a front surface, said front surface having a stationary mould;
   a movable platen also mounted to the tie bars and said movable platen having a movable mould, said movable mould defines, together with the stationary mould, a cavity for a moulding article;
   a mould opening/closing means for moving the movable platen to open or close said stationary and movable moulds;
   a housing disposed at the back surface of the stationary platen, said housing having an injection cylinder in which an injection piston slides, said injection piston having a peripheral surface; and
   a mould clamping means for applying a mould clamping force to said stationary and movable moulds against an injection pressure acting on the injection piston so as to clamp said stationary and movable moulds together,
   the mould clamping means including a converting means for converting the injection pressure into the mould clamping force and transmitting the mould clamping force to said stationary and movable moulds, so that a mould clamping process is synchronized with an injection process.

2. A mould clamping apparatus according to claim 1, wherein the movable platen is mounted at a first end of the tie bars;
   the mould clamping means having a mould clamping piston having a peripheral surface, said mould clamping piston being reciprocatively disposed in the injection cylinder to face the injection piston and where said injection pressure is applied to said mould clamping piston; and the converting means having an auxiliary movable platen mounted at a second end of the tie bars and said coverting means having a lock means for the movable platen, said lock means interlocking the auxiliary movable platen with the mould clamping piston, said lock means transmitting the injection pressure to the movable platen via the tie bars when the molten material is injected into the cavity and said lock means releasing the interlocking relation between the auxiliary movable platen and the mould clamping piston when said stationary and movable moulds are opened.

3. A mould clamping apparatus according to claim 2, wherein the lock means of the converting means has a lock plate, said lock plate having an inner spline and being mounted to the auxiliary movable platen in a rotatable manner relative to the mould clamping piston, said lock plate further having an outer spline formed in the peripheral surface of the mould clamping piston and alignable with the inner spline of the lock plate.

4. A mould clamping apparatus according to claim 3, wherein an inclination is provided at at least one end of said mould clamping piston and an edge of the lock plate which faces the mould clamping piston in order to ensure a relative rotation of the lock plate.

5. A mould clamping apparatus according to claim 3, wherein the mould clamping means has a booster ram disposed in the injection cylinder between the injection piston and the mould clamping piston.

6. A mould clamping apparatus according to claim 2, wherein the mould opening/closing means has a plurality of mould opening/closing cylinders formed in the housing;

each of the tie bars having a head which slides in a corresponding mould opening/closing cylinder, so that the tie bars serves as a mould opening/closing piston; and whereby an operation of the tie bars and the injection piston is controlled by supplying pressurized oil to each mould opening/closing cylinder and the injection cylinder.

7. A mould clamping apparatus according to claim 2, wherein ball screws are formed on the peripheral surface of the injection piston and the peripheral surface of the tie bars so that a driving force of a motor is transmitted to nuts to be engaged with the ball screws, thereby controlling operation of the injection piston and the movable platen.

8. A mould clamping apparatus according to claim 1, wherein the mould clamping means has a mould clamping cylinder disposed at the back surface of the stationary platen, a mould clamping piston, which slides in the mould clamping cylinder to press the stationary mould toward the movable mould, and a lock means, which locks the movable platen when a molten material is injected into the cavity and said lock means unlocking the movable platen when the moulds are opened; and the converting means having a chamber, said chamber being formed in a first head of the injection piston, the injector piston having a second head which is housed in said chamber, said second head having a smaller diameter than said first head, and a connection passage, which communicates said chamber with the mould clamping cylinder, said connection passage being filled with a working medium.

9. A mould clamping apparatus according to claim 8, wherein the movable platen is mounted at a first end of the tie bars and the stationary platen is mounted at a center portion of the tie bars; and the lock means having an auxiliary movable platen, said auxiliary movable platen being mounted at a second end of the tie bars, a hollow lock plate having an inner spline, said lock plate being attached to the auxiliary movable platen, and a lock bar having a peripheral surface, said peripheral surface of said bar having an outer spline alignable with the inner spline, and said peripheral surface of said lock bar extending from the back of the stationary platen, the lock plate being rotatable relative to the lock bar.

10. A mould clamping apparatus according to claim 8, wherein the stationary platen is mounted at a first end of the tie bars and the movable platen is mounted at a center portion of the tie bars; and the lock means having an auxiliary platen attached to a second end of the tie bars, a hollow lock plate having an inner spline, said hollow lock plate being attached to the auxiliary platen, and a lock bar having a peripheral surface, said peripheral surface of said lock bar having an outer spline alignable with the inner spline, and said peripheral surface of said lock bar extending from the back of the movable platen, the lock plate being rotatable relative to the lock bar.

* * * * *